(No Model.)

H. E. KIRSTEIN.
EYEGLASS FRAME.

No. 336,722. Patented Feb. 23, 1886.

Witnesses.

Inventor.
H. E. Kirstein.
By Geo. M. Hopkins,
Atty.

UNITED STATES PATENT OFFICE.

HENRY EDWARD KIRSTEIN, OF ROCHESTER, NEW YORK.

EYEGLASS-FRAME.

SPECIFICATION forming part of Letters Patent No. 336,722, dated February 23, 1886.

Application filed September 24, 1885. Serial No. 178,029. (No model.)

*To all whom it may concern:*

Be it known that I, HENRY EDWARD KIRSTEIN, of Rochester, in the county of Monroe, State of New York, have invented a new and useful Improvement in Eyeglass-Frames, of which the following is a specification, reference being had to the annexed drawings, forming a part thereof, in which—

Figure 1:
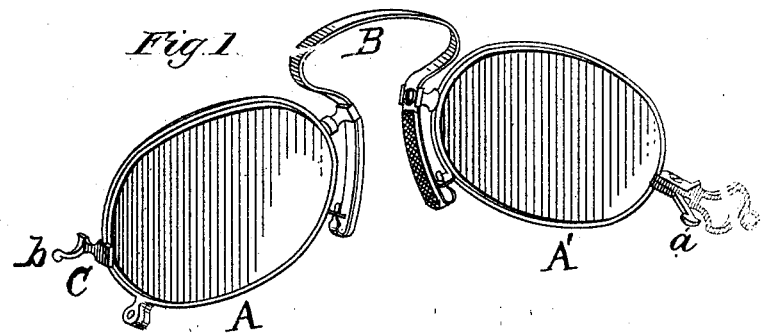
Figure 2:
Figure 3:
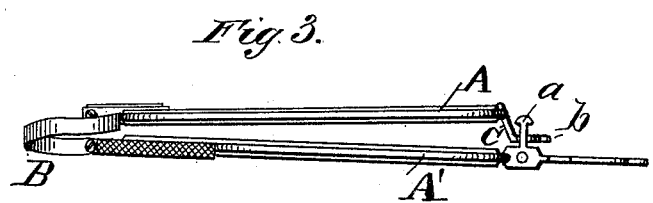

Figure 1 is a perspective view of a pair of eyeglasses embodying my invention. Fig. 2 is a detailed edge view of a part of the bow, and Fig. 3 represents the eyeglasses closed.

The object of my invention is to provide an eyeglass-frame which, when closed one part over the other, will hold the two parts of the frame a short distance from each other, so that the lenses held by the frame cannot touch each other.

My invention is also designed to facilitate the closing of the eyeglass-frame and to insure its remaining closed.

My invention consists in an arm attached to one eye of the frame, and offset so as to lie out of the plane of the lenses and in the stud projecting from the opposite path of the frame adapted to engage the offset arm.

The eyeglass-frame is composed of rims A A', connected by the nose-spring B in the usual well-known way. From the handle formed on the rim A' a stud, *a*, projects, and to the edge of the rim A is secured a right-angled arm, C, the portion attached to the rim A being approximately at right angles with the plane of the rim, and the curved arm *b* being approximately parallel with the plane of the rim, but removed a short distance from it, as shown in Fig. 2, so that when the lenses are closed one over the other, as in Fig. 3, they will be separated, and will be prevented from coming into contact with each other by the offset arm C.

The arm C may be formed integrally with the rim A, or it may be made separately and attached thereto by brazing or otherwise, in the case of metallic frame, and it may be formed separately and attached to the frame by screws or rivets, when the frame is made of rubber, tortoise-shell, zylonite, or similar material.

When the eyeglasses are of the kind known as "rimless," the arm C will be attached directly to one of the lenses.

Having thus described my invention, what I claim as new, and desire to secure by Letters Patent, is—

1. The combination, with the eyeglass-frame provided with a stud, *a*, of an offset arm, C, arranged to engage the stud when the frames are closed, and to separate the two parts of the frame to prevent the contact of the two lenses, substantially as herein described.

2. As an improved article of manufacture, an eyeglass-frame composed of rims A A', connected by a nose-spring, B, a stud, *a*, projecting from the handle of the rim A', and an angled offset arm, C, formed on or attached to the rim A, substantially as described.

HENRY EDWARD KIRSTEIN.

Witnesses:
 GEO. M. HOPKINS,
 C. L. TOPLIFF.